(12) United States Patent
Nakazawa et al.

(10) Patent No.: US 8,262,374 B2
(45) Date of Patent: Sep. 11, 2012

(54) MOTOR PUMP FOR HEADLAMP CLEANER

(75) Inventors: Yuichi Nakazawa, Shizuoka (JP); Akinobu Kubota, Shizuoka (JP); Masaaki Sato, Shizuoka (JP); Takanori Haraki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 627 days.

(21) Appl. No.: 12/167,612

(22) Filed: Jul. 3, 2008

(65) Prior Publication Data

US 2009/0010787 A1 Jan. 8, 2009

(30) Foreign Application Priority Data

Jul. 5, 2007 (JP) ................................. 2007-176944

(51) Int. Cl.
  *H02K 11/00* (2006.01)
  *F04B 35/04* (2006.01)
(52) U.S. Cl. ..... 417/423.7; 310/71; 310/89; 417/423.14
(58) Field of Classification Search ............. 417/423.14, 417/423.7, 424.1, 231; 222/383.2; 239/284.1, 239/284.2; 310/71, 89
See application file for complete search history.

(56) References Cited

U.S. PATENT DOCUMENTS

| | | | | |
|---|---|---|---|---|
| 6,619,933 B2 * | 9/2003 | Ikeda | ......................... | 417/410.1 |
| 6,663,362 B1 * | 12/2003 | Lentz et al. | ................. | 417/423.7 |
| 6,675,989 B1 * | 1/2004 | Ritter et al. | ....................... | 222/61 |
| 6,949,851 B2 * | 9/2005 | Wysk et al. | ....................... | 310/89 |
| 2005/0106046 A1 * | 5/2005 | Winkler | ..................... | 417/423.3 |
| 2006/0220474 A1 * | 10/2006 | Yoshida | ......................... | 310/43 |
| 2008/0304988 A1 | 12/2008 | Asaka | | |

FOREIGN PATENT DOCUMENTS

| | | |
|---|---|---|
| CN | 101324236 A | 12/2008 |
| DE | 39 22 230 A1 | 1/1991 |
| DE | 41 20 665 A1 | 12/1992 |
| DE | 44 11 960 A1 | 10/1995 |
| EP | 1 410 965 A1 | 4/2004 |
| JP | 58-107554 A | 6/1983 |
| JP | 4121256 | 4/1992 |
| JP | 2003-515059 A | 4/2003 |

(Continued)

OTHER PUBLICATIONS

Extended European Search Report for European Application No. 08159757.7-2207 dated Feb. 9, 2010, 7 pages.

(Continued)

*Primary Examiner* — Devon Kramer
*Assistant Examiner* — Bryan Lettman
(74) *Attorney, Agent, or Firm* — Osha Liang LLP

(57) ABSTRACT

A motor pump for a headlamp cleaner includes a motor, a control circuit board for driving the motor, an impeller rotatable by the motor, a plurality of terminal pieces adapted to be coupled to an outside connector, and a casing. The casing includes a pump chamber having a washer fluid suction port and a discharge port and inside which the impeller is accommodated, a motor housing chamber disposed above the pump chamber and inside which the motor is accommodated, a board housing chamber inside which the control circuit board is accommodated, and a connector portion extending outwardly in a cylindrical shape and inside which the plurality of terminal pieces extends. The connector portion is provided such that one of the terminal pieces is directly coupled to the motor.

19 Claims, 14 Drawing Sheets

FOREIGN PATENT DOCUMENTS

| | | |
|---|---|---|
| JP | 2003-322082 A | 11/2003 |
| JP | 2004-162541 A | 6/2004 |
| JP | 2004-350458 A | 12/2004 |
| JP | 2006-291776 A | 10/2006 |
| WO | 2008/019818 A1 | 2/2008 |

OTHER PUBLICATIONS

Chinese Office Action for Application No. 200810127663.4, mailed on Jan. 8, 2010 (9 pages).

English abstract for Japanese Publication No. 2004-350458, publication date Dec. 9, 2004, esp@cenet database, (1 page).

Korean Office Action for Application No. 10-2008-0064898, mailed on Mar. 31, 2010 (13 pages).

English abstract for Japanese Publication No. 2006-291776, publication date Oct. 26, 2006, esp@cenet database, (1 page).

Abstract of JP4121256 (Publication date Apr. 22, 1992) supplied from the esp@cenet database—Worldwide, on Jun. 16, 2008, 1 page.

Office Action Issued in Chinese Application No. 200810127663.4, Dated Oct. 26, 2011 (11Pages with English Translation).

Japanese Office Action for Application No. JP 2007-176944, mailed on Jun. 19, 2012 (3 pages).

\* cited by examiner

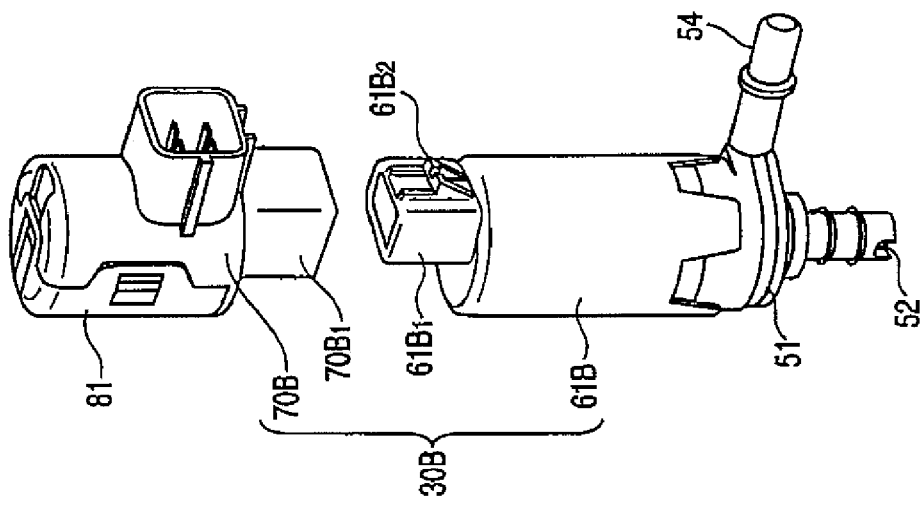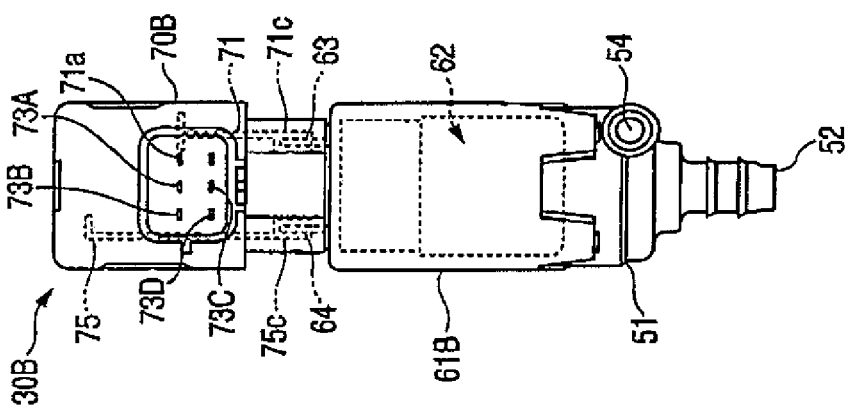

000000# MOTOR PUMP FOR HEADLAMP CLEANER

FIELD OF INVENTION

The present invention relates to a motor pump for use in a headlamp cleaner, which is operable to wash vehicle headlamps by pumping a washer fluid inside a tank with a motor to pressure-feed the washer fluid through a conduit and to eject the washer fluid from nozzles to the headlamps, More specifically, the present invention relates to such a motor pump in which a control circuit board for driving the motor is incorporated.

BACKGROUND ART

Some vehicles, such as automobiles, are equipped with a headlamp cleaner for washing surfaces of headlamps with washer fluid, in order to remove dirt from the surfaces of the headlamps to ensure visibility, which may otherwise result in deterioration of a lighting function of the headlamps.

Related art headlamp cleaners include, for example, a tank for holding a washer fluid, a motor pump fixed to an outer side of a side wall of the tank to pump and to pressure-feed the washer fluid inside the tank, a nozzle which ejects the washer fluid toward a headlamp, and a washer fluid conduit coupling the nozzle and the motor pump. Generally, the motor pump includes a cylindrical casing having a pump chamber and a motor housing chamber above the pump chamber, and a suction port and a discharge port are communicated with each other via the pump chamber. The motor pump further includes a motor disposed inside the motor housing chamber, and an impeller disposed inside the pump chamber. The impeller is rotationally driven by the motor to pump the washer fluid inside the tank from the suction port and to discharge the washer fluid from the discharge port into the washer fluid conduit, thereby pressure-feeding the washer fluid toward the nozzle.

JP 4-121256A discloses a motor pump having a control circuit board which is incorporated inside the casing to control driving of the motor.

SUMMARY OF INVENTION

As far as we, the inventors, are aware, the motor pump disclosed in JP 4-121256A has not been implemented as an actual product. In our view, the reasons why the motor pump has not been put into practice are as follows.

Firstly, as shown in FIG. 8 of JP 4-121256A, which is a longitudinal sectional view of the motor pump, the control circuit board is arranged between the motor and a connector portion provided at an uppermost portion of the motor pump. Thus, the configuration of the motor pump is substantially limited such that the control circuit board can only be arranged along a direction perpendicular to a motor shaft (hereinafter, a lateral arrangement). Accordingly, design freedom of the motor pump is limited.

Secondly, because of the above configuration, all of the terminals of the connector portion (namely, a power feeding terminal, an grounding terminal and control signal terminals) are coupled to a control circuit on the control circuit board, and thus, the motor needs to be powered from a power feeding terminal of the control circuit of the control circuit board (see, e.g., FIG. 1 of JP 4-121256A). The control circuit of the control circuit board and the respective terminals are usually coupled by an engagement between the terminals and engaging holes formed on the board. That is, the engaging holes corresponding to all of the terminals needs to be formed on the control circuit board so that a size of the control circuit board is becomes large. As a result) the motor pump becomes large-sized, e.g., an outer diameter of the casing is increased. Moreover, the motor pump is fixed to a recess portion of the side wall of the washer fluid tank, which is formed by inwardly denting the side wall. Consequently, the recess portion of the tank also becomes large, resulting in a decrease of effective capacity of the tank, i.e., an amount of washer fluid to be held in the tank.

One or more embodiments of the present invention improve design freedom of a motor pump while keeping a size of the motor pump small.

According to an aspect of one or more embodiments of the invention, a motor pump for a headlamp cleaner is provided. The motor pump includes a motor, a control circuit board for driving the motor, an impeller rotatable by a motor, a plurality of terminal pieces adapted to be coupled to an outside connector, and a casing. The casing includes a pump chamber having a washer fluid suction port and a discharge port and inside which the impeller is accommodated, a motor housing chamber disposed above the pump chamber and inside which the motor is accommodated, a board housing chamber inside which the control circuit board is accommodated, and a connector portion extending outwardly in a cylindrical shape and inside which the plurality of terminal pieces extends. The connector portion is provided such that one of the terminal pieces is directly coupled to the motor.

According to such a configuration, the control circuit board can be arranged parallel to a drive shaft of the motor (hereinafter, a vertical arrangement), or perpendicular to the drive shaft of the motor (hereinafter, a lateral arrangement). Thus, the design freedom of the motor pump is drastically improved.

According to another aspect of one or more embodiments of the invention, the connector portion may extend sideways with respect to a direction in which the drive shaft extends.

According to another aspect of one or more embodiments of the invention, each of the terminal pieces may be a busbar.

According to another aspect of one or more embodiments of the invention, the plurality of terminal pieces may include a power feeding terminal piece via which a power is fed to the motor from the outside connector, a grounding terminal piece, and a plurality of control signal terminal pieces coupled to the control circuit board, either one of the power feeding terminal piece and the grounding terminal piece being directly coupled to the motor.

According to another aspect of one or more embodiments of the invention, the casing may further include a terminal portion having a reference plane facing the board housing chamber, in which the plurality of control signal terminal pieces extends through the terminal portion and protrudes toward the board housing chamber from the reference plane, the control circuit board is formed with terminal engaging holes corresponding to the respective control signal terminal pieces, and each of the control signal terminal pieces engages with the corresponding one of the terminal engaging holes such that the control circuit board abuts the reference plane.

According to another aspect of one or more embodiments of the invention, the casing may farther include a detachable cover which, when attached, covers the control circuit board to form the board housing chamber, and the control signal terminal pieces may protrude from the terminal engaging holes toward the cover.

According to another aspect of one or more embodiments of the invention, the board housing chamber may be disposed above the motor housing chamber and on a side of the connector portion.

According to another aspect of one or more embodiments of the invention, the board housing chamber may be disposed below the connector portion and on a side of the motor housing chamber.

According to another aspect of one or more embodiments of the invention, the connector portion may extend in a direction perpendicular to a heightwise direction of the casing, and a heightwise dimension of the board housing chamber may be larger than a lateral dimension of the board housing chamber which is about one half of a lateral dimension of the motor housing chamber so that the control circuit board is vertically arranged inside the board housing chamber.

According to another aspect of one or more embodiments of the invention, the connector portion may extend in an obliquely upward direction from the motor housing chamber, and a heightwise dimension of the board housing chamber may be larger than a lateral dimension of the board housing chamber so that the control circuit board is vertically arranged inside the board housing chamber.

According to another aspect of one or more embodiments of the invention, the connector portion may extend in a direction perpendicular to a heightwise direction of the casing, and a heightwise dimension of the board housing chamber may be smaller than a lateral dimension of the board housing chamber which is about the same as a lateral dimension of the motor housing chamber so that the control circuit board is laterally arranged inside the board housing chamber.

Other aspects and advantages of the invention will be apparent from the following description, the drawings and the claims.

BRIEF DESCRIPTION OF DRAWINGS

FIG. 9A is a front view of a motor pump according to a third exemplary embodiment of the invention;

FIG. 9B is a perspective view of the motor pump in which a connector portion is separated;

FIG. 9C is a perspective showing a coupling structure between terminals of a connector and electrode terminals of the motor;

DETAILED DESCRIPTION

Hereinafter, exemplary embodiments of the invention will be explained with reference to the drawings.

Figure 1:
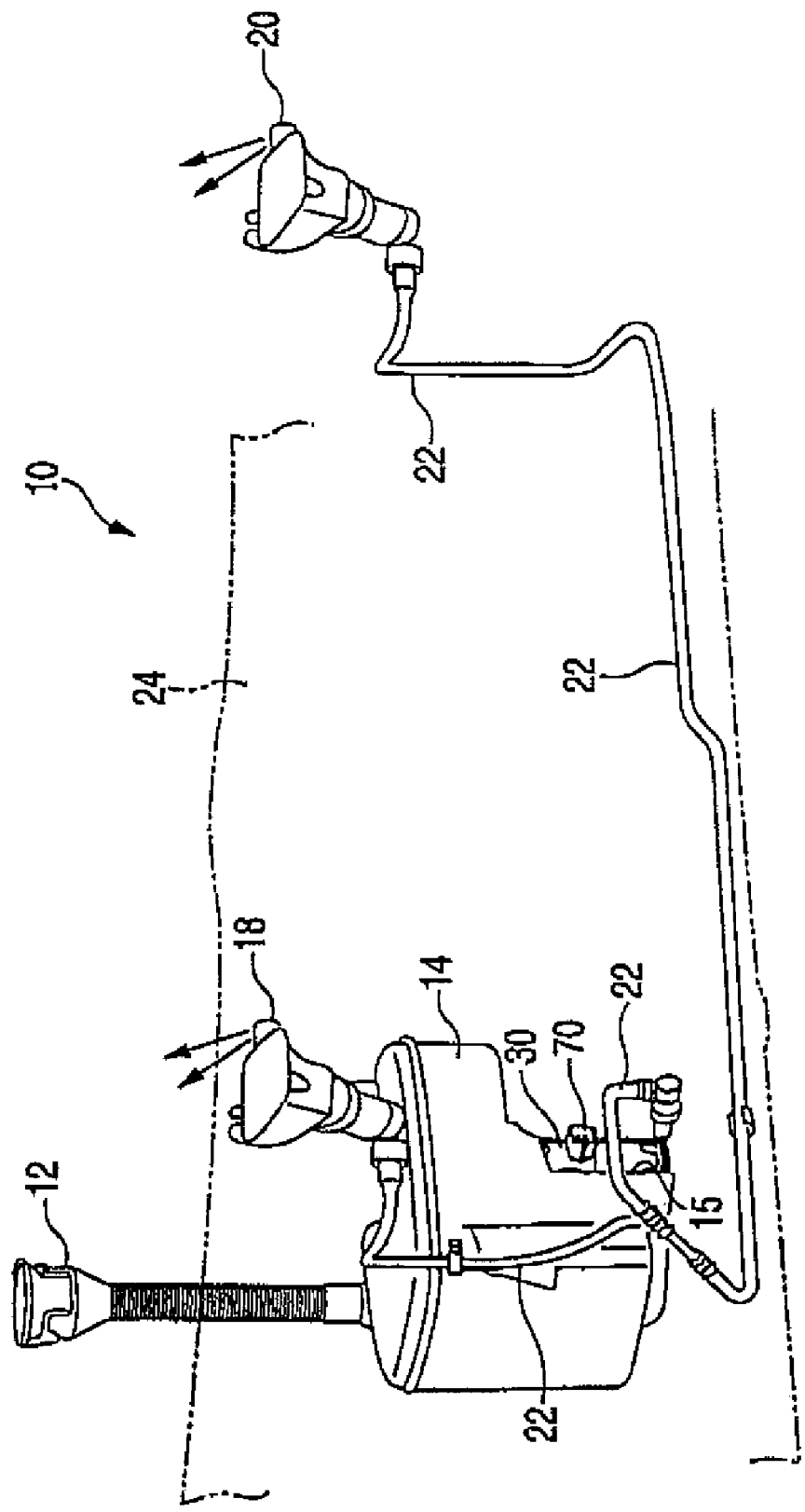
FIG. 1 is a perspective view of a headlamp cleaner according to one or more embodiments of the invention.
Figure 2A:
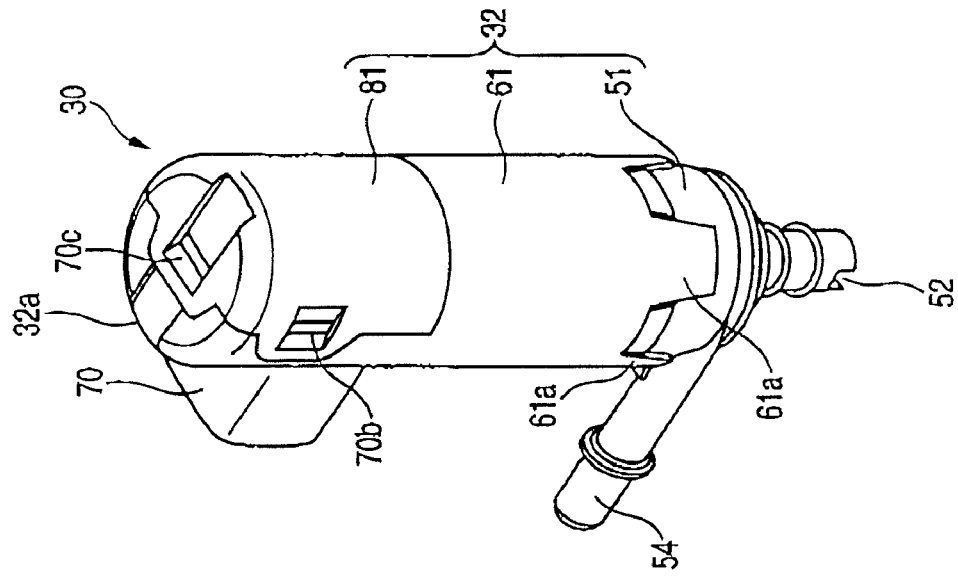
FIG. 2A is a perspective view of a motor pump of the headlamp cleaner according to a first exemplary embodiment of the invention.
Figure 2B:
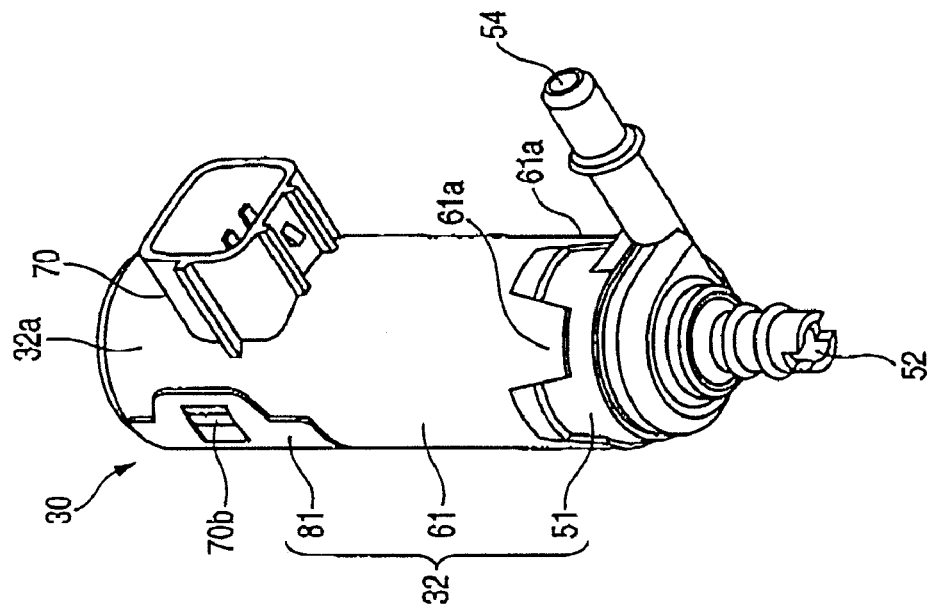
FIG. 2B is another perspective view of the motor pump when seen from a rear side of a connector.

As shown in FIG. 1, a headlamp cleaner 10 includes a tank 14 for holding a washer fluid, a motor pump 30 which pumps the washer fluid inside the tank 14 and pressure-feeds the washer fluid into a conduit 22, and nozzles 18, 20 disposed at distal ends of the conduit 22 to eject the washer fluid toward right and left headlamps (not shown) of a vehicle. The headlamp cleaner 10 is arranged on a rear side of a bumper 24 of a vehicle body. The headlamp cleaner 10 further includes a filling port 12 from which the washer fluid is supplied into the tank 14.

The washer fluid inside the tank 14 is pumped by the motor pump 30 and is pressure-fed to the respective nozzles 18, 20 so that surfaces of the headlamps are cleaned with the washer fluids ejected from the respective nozzles 18, 20, whereby the functions of the headlamps can be restored to ensure visibility even when a dirt is stuck onto the headlamps.

First Exemplary Embodiment

As shown in FIGS. 2A to 5, a motor pump 30 according to a first exemplary embodiment has a cylindrical casing 32 inside which a pump chamber 50, a motor housing chamber 60 and a board housing chamber 80 are integrally formed. The pump chamber 50 is formed below the motor housing chamber 60 in which a motor 62 is accommodated, and the motor housing chamber 60 is formed below the board housing chamber 80 in which a control circuit board 82 is accommodated. The casing includes a connector portion 70 to which a power-side connector 90 is coupled.

The pump chamber 50 communicates with an inner side of the tank 14 via a suction port 52 below the pump chamber 50 and with the conduit 22 via a discharge port 54 extending sideways from the pump chamber 50. In the pump chamber 50, there is arranged an impeller 56 which is coupled to a drive shaft 65 of the motor 62 disposed inside the motor housing chamber 60. A bushing 58 is arranged between the pump chamber 50 and the motor housing chamber 60 to seal a space therebetween. As shown in FIG. 1, the motor pump 30 is held in a recess portion 15 formed on a side wall of the tank 14, and is fixed such that the suction port 52 extends into the tank 14. Accordingly, the washer fluid is introduced from the suction port 52 into the pump chamber 50 as the impeller 56 is rotated by the motor 62, and is pressure-fed from the discharge port 54 into the conduit 22.

The connector portion 70 is disposed between the motor housing chamber 60 and the board housing chamber 80. That is, the connector portion 70 outwardly extends, in a cylindrical shape, from a portion of the casing 32 above the motor housing chamber 60 in a direction intersecting with (in the first exemplary embodiment, substantially orthogonal to) a longitudinal direction of the casing 32, and a plurality of terminal pieces 71, 72, 73 are arranged on an inner side of the connector portion 70. The connector portion 70 extends, more specifically, sideways from a lower half of the portion of the casing 32 above the motor housing chamber 60. In other words, a base end portion of the connector portion 70 is a part of a semicylindrical portion 32a of the casing 32. The board housing chamber 80 is formed on a rear side of the base end portion of the connector portion 70 (the semicylindrical portion 32a) inside the casing 32, and the control circuit board 82 having a control circuit 82a for driving the motor 62 is accommodated in the board housing chamber 80. The board housing chamber 80 occupies about a half of horizontal sectional area of an upper portion of the casing 32, and is formed to have a vertically long space allowing the control circuit board 82 to be arranged in a vertical direction (i.e., the vertical arrangement).

The terminal pieces 71, 72, 73 inside the connector portion 70 are arranged between the control circuit board 82, which is accommodated inside the board housing chamber 80, and the motor 62, which is accommodated inside the motor housing chamber 60.

Figure 4:
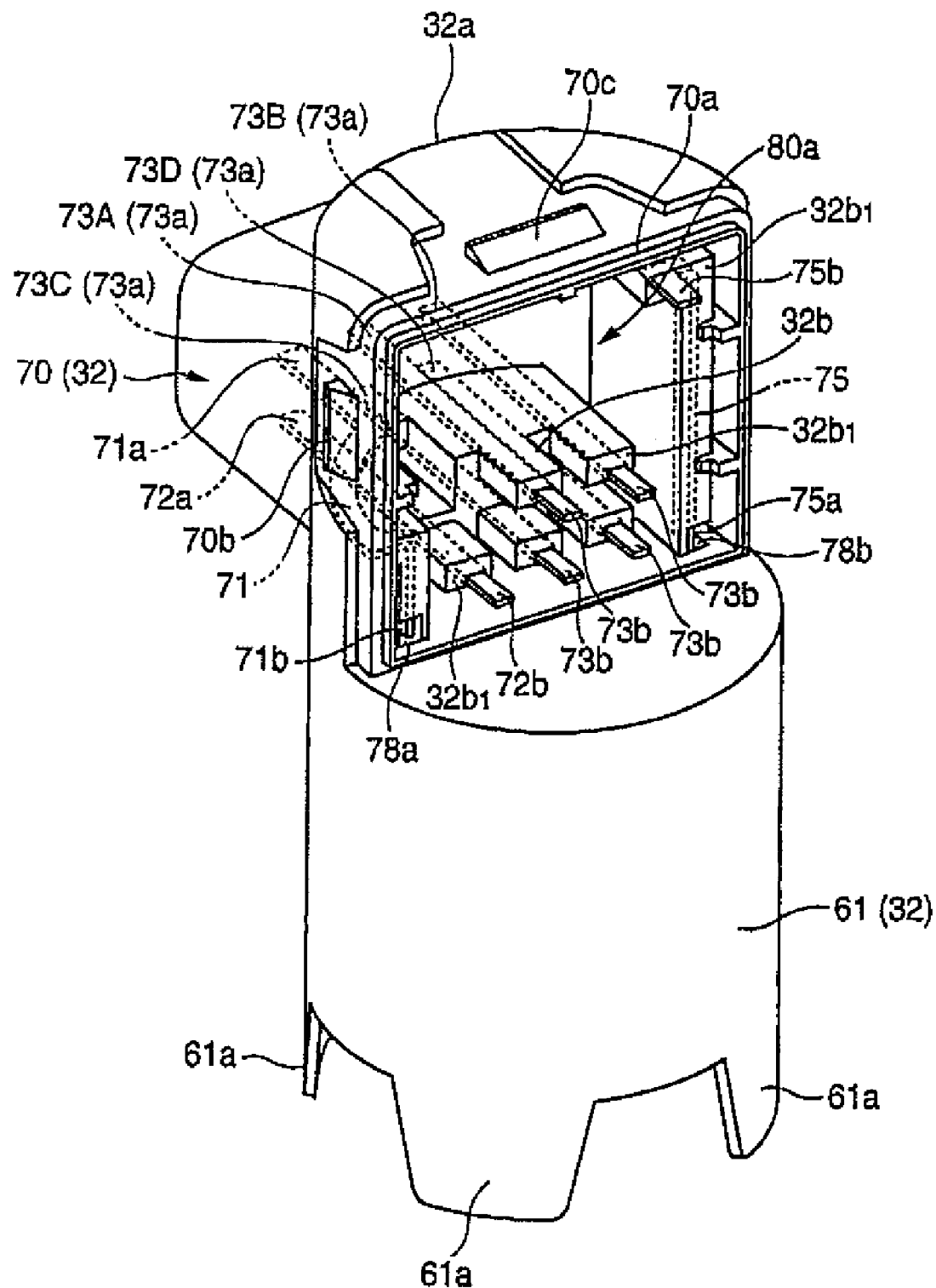
FIG. 4 is a perspective view of a portion of the motor pump.
Figure 5:
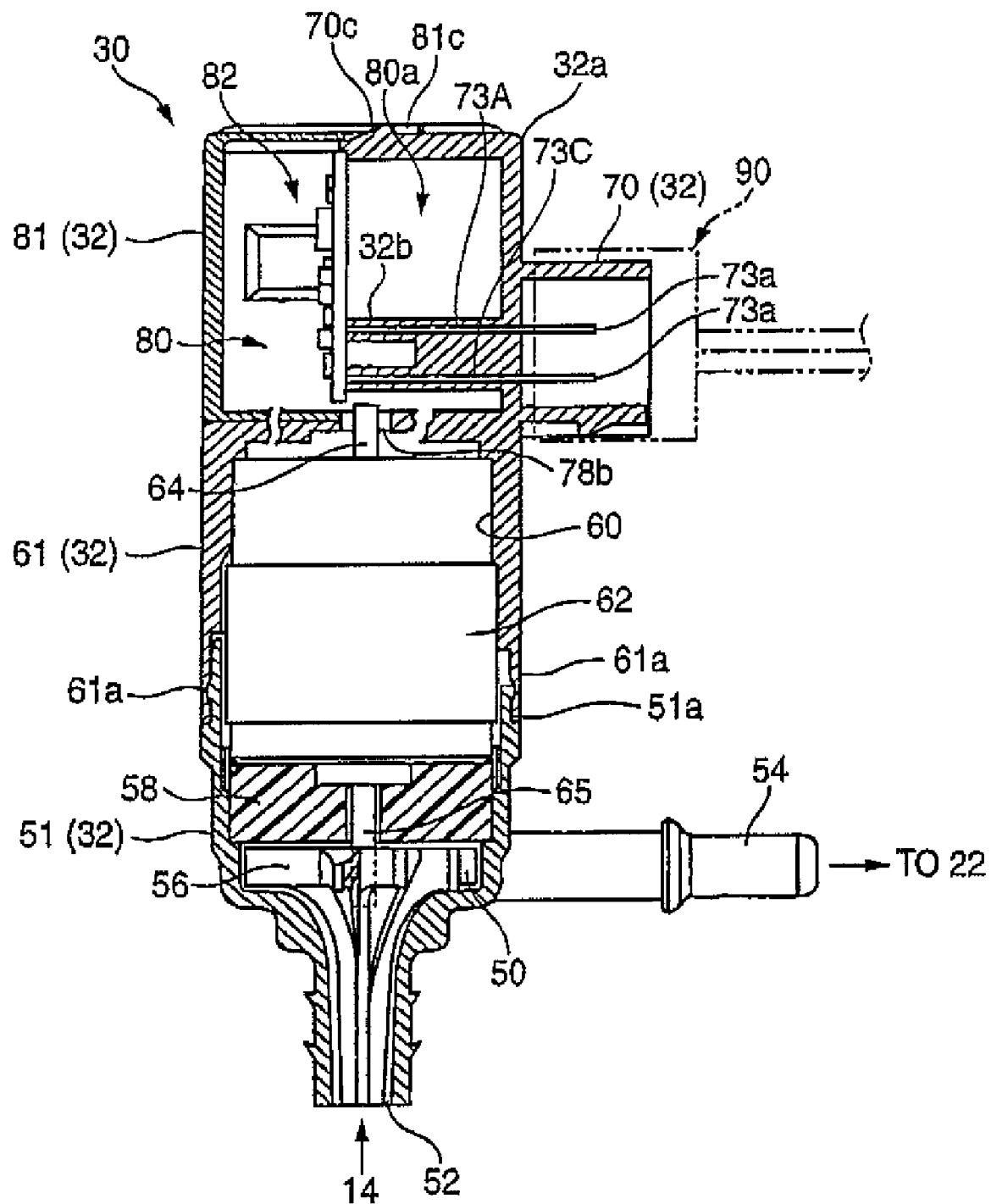
FIG. 5 is a longitudinal sectional view of the motor pump.

More specifically, as shown in FIGS. 4 and 5, the power feeding terminal piece 71, the grounding terminal piece 72 and the control signal terminal pieces 73 are integrally fixed to the casing 32 inside of the connector portion 70, and respective tip ends 71a, 72a, 73a thereof are arranged in two stages (in upper and lower rows). The terminal pieces 71, 72, 73 are busbars which are stripe-shaped pieces made of conductive material.

As shown in FIG. 4, the power feeding terminal piece 71 horizontally extends along a curved wall of the casing 32, and is downwardly bent such that the other end 71b of the terminal piece 71 is exposed at a communication hole 78a, via which the motor housing chamber 60 and a inner space of the connector portion (and the board housing chamber 80) are communicated with each other, to contact a positive electrode terminal 63 of the motor 62.

The grounding terminal piece 72 and the control signal terminal pieces 73 are straight busbars horizontally extending through a terminal portion 32b, which is a portion of the casing 32, from the inner side of the connector portion 70 into the board housing chamber 80. End portions 72b, 73b of the terminal pieces 72, 73 protruding into the board housing chamber 80 are inserted into respective terminal engaging holes 83 of the control circuit board 82, and are soldered to a conducting path (not shown) formed around the terminal engaging holes 83 for control signals. The control signal terminal pieces 73 includes a headlamp signal terminal piece 73A, a front windshield washer signal terminal piece 73B, a cleaner switch signal terminal piece 73C and an ignition signal terminal piece 73D.

Another grounding terminal piece 75 is also a busbar, and electrically couples a negative electrode terminal 64 of the motor 62 and a grounding conducting path (not shown) on the control circuit board 82. A lower end portion 75a of this grounding terminal piece 75 is exposed at a communication hole 78b commnunicating the motor housing chamber 60 and the inner space of the connector portion 70 (and the board housing chamber 80), and contacts the negative electrode terminal 64. On the other hand, the other end portion 75b of the grounding terminal 75 protruding into the board housing chamber 80 is inserted into a corresponding terminal engaging hole 83 of the control circuit board 82, and is soldered to the grounding conducting path around the terminal engaging hole 83.

As described above, the power feeding terminal piece 71 and the grounding terminal piece 75 are coupled to the electrode terminals 63, 64 of the motor 62 through the communication holes 78a, 78b, while these communication holes 78a, 78b communicates the motor housing chamber 60 and the board housing chamber 80 with each other. Therefore, the communication holes 78a, 78b facilitate a generation of air convections between the motor housing chamber 60 and the board housing chamber 80, thereby preventing heat from being confined within the motor housing chamber 60. More specifically, an air hole (not shown) is formed in a lower portion of a side wall of a motor housing 61. Thus, air heated by a heat of the motor inside the motor housing chamber 60 flows into the board housing chamber 80 through the communication holes 78a, 78b, while cold air flows into the motor housing chamber 60 from outside through the air hole, whereby the air convections are generated between the motor housing chamber 60 and the board housing chamber 80.

The protruding end portions 72b, 73b, 75b of the grounding terminal pieces 72, 75 and the control signal terminal pieces 73 are positioned in alignment with the corresponding terminal engaging holes 83 of the control circuit board 82, and protruding lengths from respective terminal reference planes 32b1 are set to be substantially equal. Therefore, an arrangement and positioning of the control circuit board 82 can be implemented simply by inserting the protruding end portions 72b, 73b, 75b into the corresponding terminal engaging holes 83 and pushing the control circuit board 82 against the terminal reference planes 32b1. Then, the protruding end portions 72b, 73b, 75b are soldered to the corresponding conducting paths around the terminal engaging holes 83, whereby the busbars 72, 73, 75 and the control circuit 82a on the control circuit board 82 can be reliably connected.

As explained above, the motor pump 30 is held and fixed in the recess portion 15 which is formed be inwardly denting the side wall of the washer fluid tank 14, and the connector portion 70 outwardly extends from the casing 32 so as to be exposed to an outer side area of the side wall of the tank 14 (see FIG. 1). Therefore, it is easy to attach or to detach the power-side connector 90 with respect to the connector portion 70.

Moreover, the power feeding terminal piece 71 inside the connector portion 70 is directly coupled to the positive electrode terminal 63 of the motor 62, i.e., not coupled to the control circuit board 82. Thus, there is no need to form a terminal engaging hole for the terminal 71b on the control circuit board 82, and the number of the terminal engaging holes 83 to be formed in the control circuit board 82 is reduced. Accordingly, the control circuit board 82 can be downsized, resulting in downsizing of the board housing chamber 80 and the motor pump 30.

By downsizing the motor pump 30, moreover, the recess portion 15 of the washer fluid tank 14 can also be made small to increase the effective capacity of the washer fluid tank 14 (i.e., to increase an amount of the washer fluid to be held in the washer fluid tank 14).

Further, instead of downsizing the control circuit board 82, motor drive control functions can be enhanced by providing an additional control circuit to a space that can be utilized in place of forming the terminal engaging hole for the terminal 71b.

Figure 3:
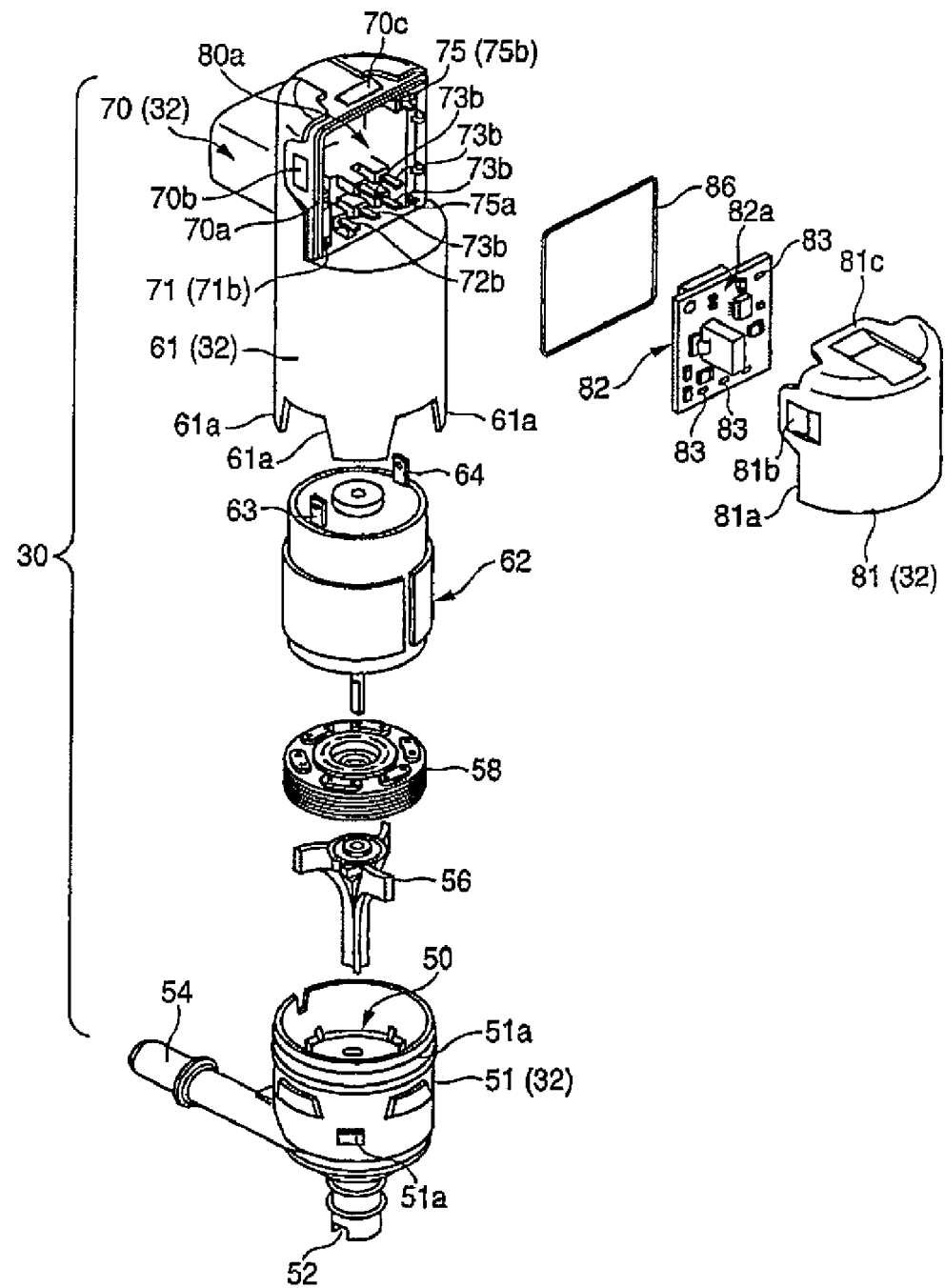
FIG. 3 is an exploded perspective view of the motor pump.

As shown in FIGS. 3 and 5, the casing 32 includes a pump housing 51 defining the pump chamber 50, the motor housing 61 defining the motor housing chamber 60 and which is formed in a one-piece structure with the connecter portion 70, and a board cover 81 defining the board housing chamber 80.

Tongue-shaped elastic hooks 61a are formed to extend from positions that are equally spaced along a circumference of a lower end of the motor housing 61, and grooves 51a are formed on an outer circumference of the pump housing 51 so as to correspond to each of the elastic hooks 61a. The motor housing 61 and the pump housing 51 are integrally attached by engaging the elastic hooks 61a and the grooves 51a with each other.

The board cover 81 is semicylindrical, and has a C-shaped longitudinal section (see FIG. 5). The board cover 81 has a rectangular front opening peripheral edge portion 81*a* (see FIG. 3) which matches a rectangular rear opening peripheral edge portion 70*a* (see FIGS. 3 and 4) of the semicylindrical portion 32*a*. The rear opening peripheral edge portion 70*a* serves as a base end portion of the connector portion 70. A pair of elastic hooks 81*b* on a side wall and another elastic hook 81*c* on a ceiling of the board cover 81 are engaged with hook engaging portions 70*b*, 70*c* of the connector portion 70, whereby the board cover 81 is integrally attached to the connector portion, i.e., to the motor housing 61. A seal packing 86 is sandwiched between the rear opening peripheral edge portion 70*a* of the connector portion 70 and the front opening peripheral edge portion 81*a* of the board cover 81, thereby keeping the board housing chamber 80 water-proof.

When assembling the motor pump 30, firstly, the motor 62 is housed inside the motor housing 61 such that the electrode terminals 63, 64 of the motor 62 are brought into contact with the end portion 71*b* of the power feeding terminal piece 71 and the end portion 75*a* of the grounding terminal piece 75, which are exposed to the communication holes 78*a*, 78*b* between the board housing chamber 80 and the motor housing chamber 60 respectively. It can be confirmed from a side of the board housing chamber 80 whether or not the terminal 63 and the terminal 71*b*, and the terminal 64 and the terminal piece 75*a* are in pressure-contact respectively. Next, the control circuit board 82 is arranged such that the terminal engaging holes 83 engage with the respective protruding end portions 72*b*, 73*b*, 75*b* protruding toward the board housing chamber 80 from the motor housing 61, and after coupling the respective terminals 72*b*, 73*b*, 75*b* to the motor drive control circuit 82*a* of the control circuit board 82, the board cover 81 is integrally assembled so as to surround the board housing chamber 80. Finally, the impeller 56 is fixed to the drive shaft 65 of the motor 62 with the bushing 58 interposed therebetween, and the pump housing 51 is fitted into the lower end portion of the motor housing 61.

Figure 6A:
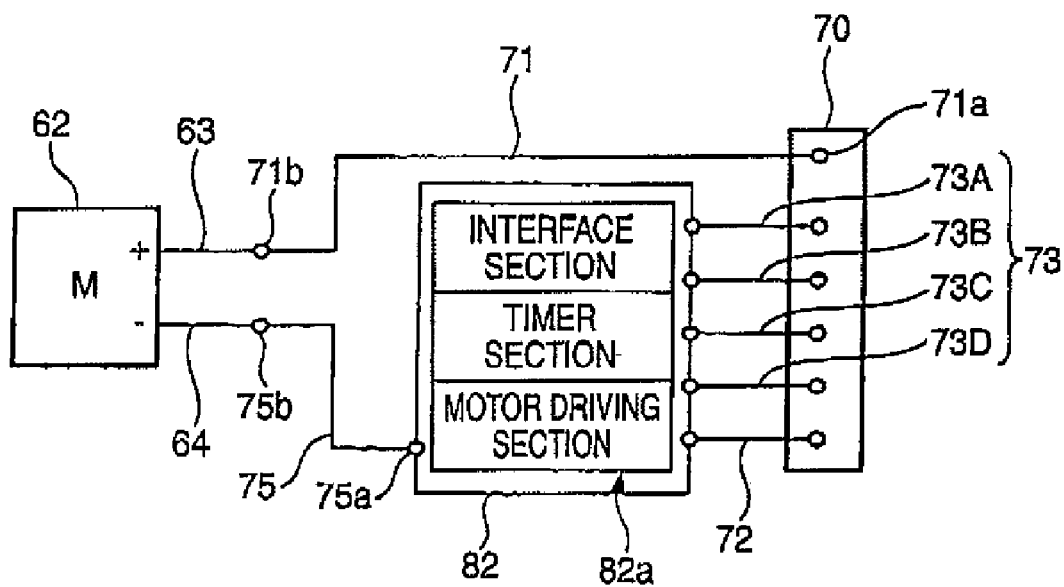
FIG. 6A is a circuit diagram of an example of a drive control circuit for a motor of the motor pump.

As shown in FIG. 6A, the motor drive control circuit 82*a* of the control circuit board 82 includes an interface section, a timer section and a motor driving section, and is configured such that, when a cleaner switch (not shown) in an interior of the vehicle is turned on, the motor 62 is instantly driven for a certain period of time (e.g., T seconds) so that the washer fluid is ejected from the nozzles 18, 20 for a certain period of time (e.g., T seconds).

Figure 7:
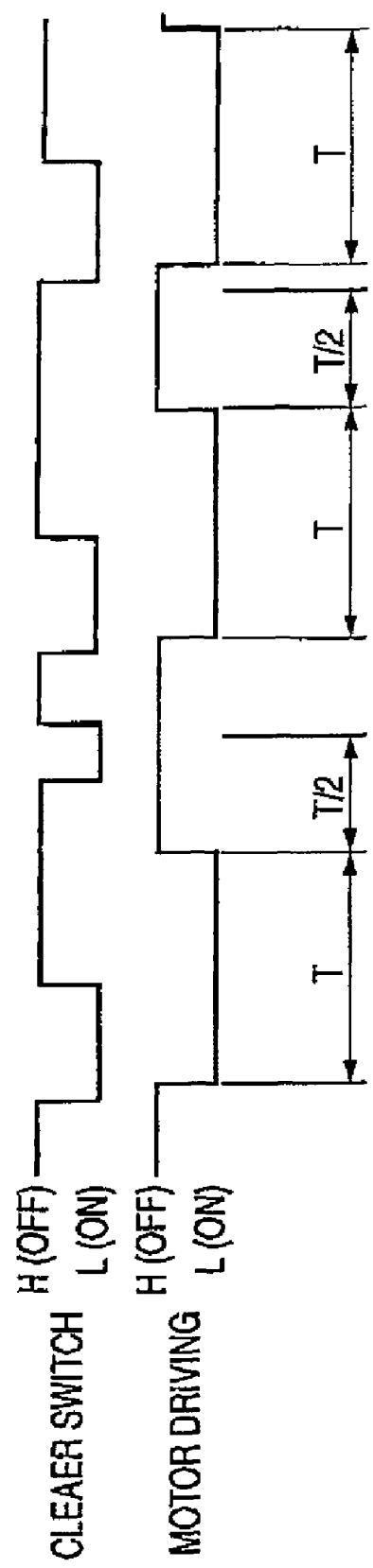
FIG. 7 is a time chart showing a control logic for driving the motor.

Moreover, this drive control circuit 82*a* is configured to have a relay circuit of the timer section and the motor driving section so as to have a control logic to inhibit a continuous driving of the motor 62. More specifically, as shown in FIG. 7, this control logic is such that an input from the cleaner switch (i.e., a signal for driving the motor 62) is not accepted until a certain period of time (e.g., T/2 seconds) elapses after a stoppage of the latest drive of the motor 62 was stopped. Accordingly, even if the cleaner switch is frequently turned on, an inactive time for the motor 62 after a drive of the motor 62 can always be ensured for a certain period of time (e.g., T/2 seconds), whereby it is possible to reliably suppress a heat generation caused by the continuous drive which might otherwise causes trouble with the motor 62.

A motor pump (not shown) for a windshield washer is also provided on the washer fluid tank 14, and is driven by turning on a windshield washer switch provided in the interior of the vehicle. When this motor pump is driven, the washer fluid inside the tank 14 is pressure-fed to a front windshield washing nozzle (not shown) through a conduit (not shown), and is ejected from the front windshield washing nozzle toward a front windshield of the vehicle. At the time of washing the front windshield with the windshield washer, the motor pump 30 is also driven under a certain condition to also wash the headlamps. For example) the motor drive control circuit 82*a* is configured such that, when the windshield washer switch is turned on while the headlamps are being turned on, the motor 62 is driven for a certain period of time irrespective of turning on and off of the cleaner switch so that the washer fluid is ejected from the nozzles 18, 20.

When the front windshield is dirty, it is likely that the headlamps are also dirty. Therefore, when a driver realizes that the front windshield is dirty during a night drive, the driver needs to operate both the windshield washer switch and the headlamp cleaner switch to wash both the front windshield and the headlamps. According to the first exemplary embodiment, however, on condition that the headlamps are being turned on, the headlamp cleaner 10 is actuated in response to the operation of the windshield washer. Thus, there is an advantage in that the headlamps can be washed without operating the headlamp cleaner switch.

In the first exemplary embodiment, the motor drive control circuit 82*a* having electronic parts mounted thereon is provided only on one surface of the control circuit board 82. However, in the semicylindrical portion 32*a*, which is the base end portion of the connector portion 70, there is a space 80*a* communicating with the board housing chamber 80 above the terminal pieces 71, 72, 73 and having a height that is about one half of a height of the board housing chamber 80*g* i.e., a height of the connector portion 70 inside which the terminal pieces 71, 72, 73 are arranged is about one half of the board housing chamber 80. Therefore, the motor drive control functions can also be enhanced by providing an additional control circuit, with other electronic parts, on the other surface of the control circuit board 82 such that the additional control circuit is accommodated inside the space 80*a* of the semicylindrical portion 32*a*.

As shown in FIG. 6A, in the first exemplary embodiment the power feeding terminal piece 71 arranged inside the connector portion 70 is directly coupled to the positive electrode terminal 63 of the motor 62, the negative electrode terminal 64 of the motor 62 is coupled to the motor drive control circuit 82*a* via the grounding terminal piece 75, the motor drive control circuit 82*a* is coupled to the grounding terminal piece 72 arranged inside the connector portion 70. Thus, the motor 62 is directly powered from inside the connector portion 70. However, the motor 62 may be powered via the motor drive control circuit 82*a*.

Figure 6B:
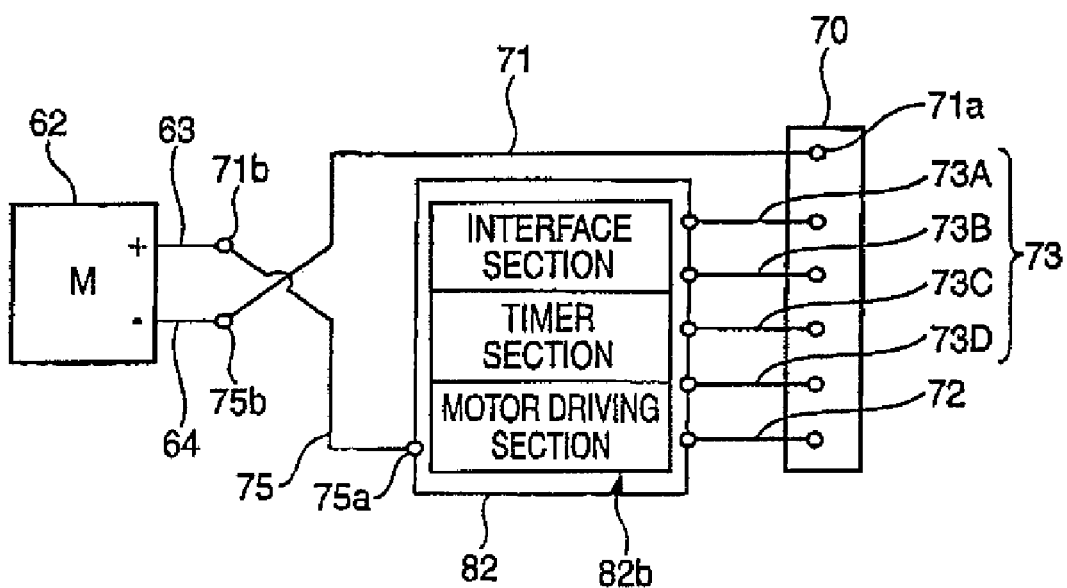
FIG. 6B is a circuit diagram of another example of a drive control circuit for the motor.

That is, as shown in FIG. 6B, there may be a configuration in which the terminal piece 71 arranged inside the connector portion 70 is directly coupled to the negative electrode terminal 64 of the motor 62 to function as a grounding terminal, the terminal piece 72 arranged inside the connector portion 70 is coupled to a motor drive control circuit 82*b* to function as a power feeding terminal, and the terminal piece 75 is coupled to the positive electrode terminal 63 of the motor 62 to function as another power feeding terminal. Of course the configuration of the motor drive control circuit 82*b* is partially different from the motor drive control circuit 82*a* shown in FIG. 6A so as to correspond to a wiring configuration shown in FIG. 6B.

Second Exemplary Embodiment

Figure 8:
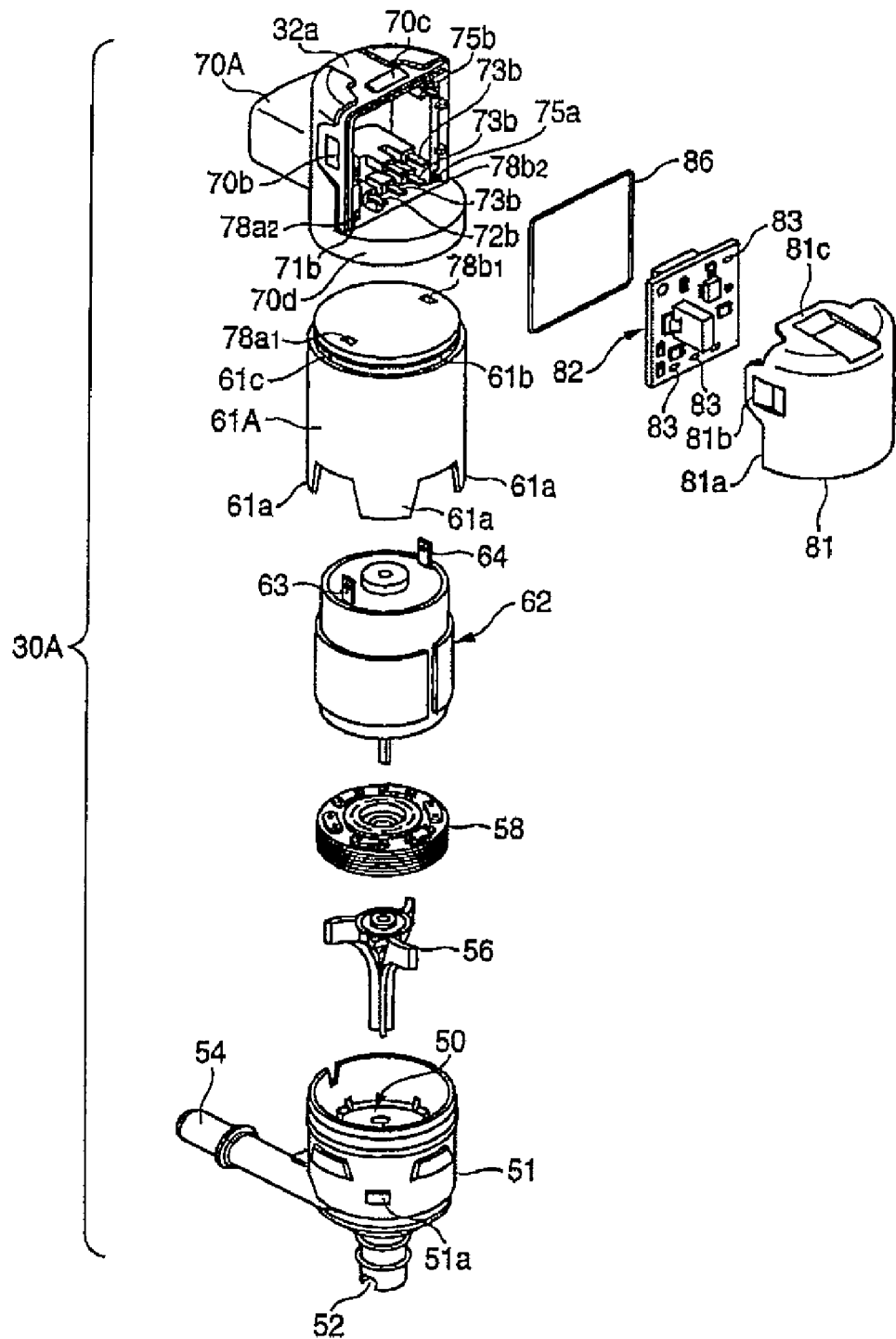
FIG. 8 is an exploded perspective view of a motor pump according to a second exemplary embodiment of the invention.

FIG. 8 is an exploded perspective view of a motor pump 30A according to a second exemplary embodiment.

While the motor pump 30 of the first exemplary embodiment is configured such that the connector portion 70 and the motor housing 61 is formed in a one-piece structure, a motor housing 61A and a connector portion 70A of the motor pump 30A are provided as separate members. The motor housing 61A and the connector portion 70A are attached together by fitting, in an longitudinal direction of the motor pump 30A, a projecting rib (not shown) formed on an inner circumference of a cylindrical lower end portion 70d of the connector portion 70A onto a groove 61b formed on an outer circumference of a ceiling portion of the motor housing 61A, with a seal ring 61c interposed therebetween.

A ceiling of the motor housing 61A is formed with holes 78a1, 78b1, through which the pair of electrode terminals 63, 64 of the motor 62 are protruded toward the motor housing chamber 60 respectively. A lower face of the connector portion 70A is also formed with holes 78a2, 78b2 corresponding to the holes 79a1, 78b1 of the motor housing 61A, and the protruding end portions 71b, 75a of the power feeding terminal piece 71 and the grounding terminal piece 75 are respectively exposed from the holes 78a1, 78b1. These holes 78a1, 78a2 and 78b1, 78b2 correspond to the communication holes 78a, 78b of the first exemplary embodiment, which are formed on the connector portion 70 of the motor pump 30.

The remaining configurations of the second exemplary embodiment are similar to those of the motor pump 30 of the first exemplary embodiment. Thus, repetitive explanations thereof are omitted and like parts are designated by the same reference numerals.

Third Exemplary Embodiment

Figure 10:
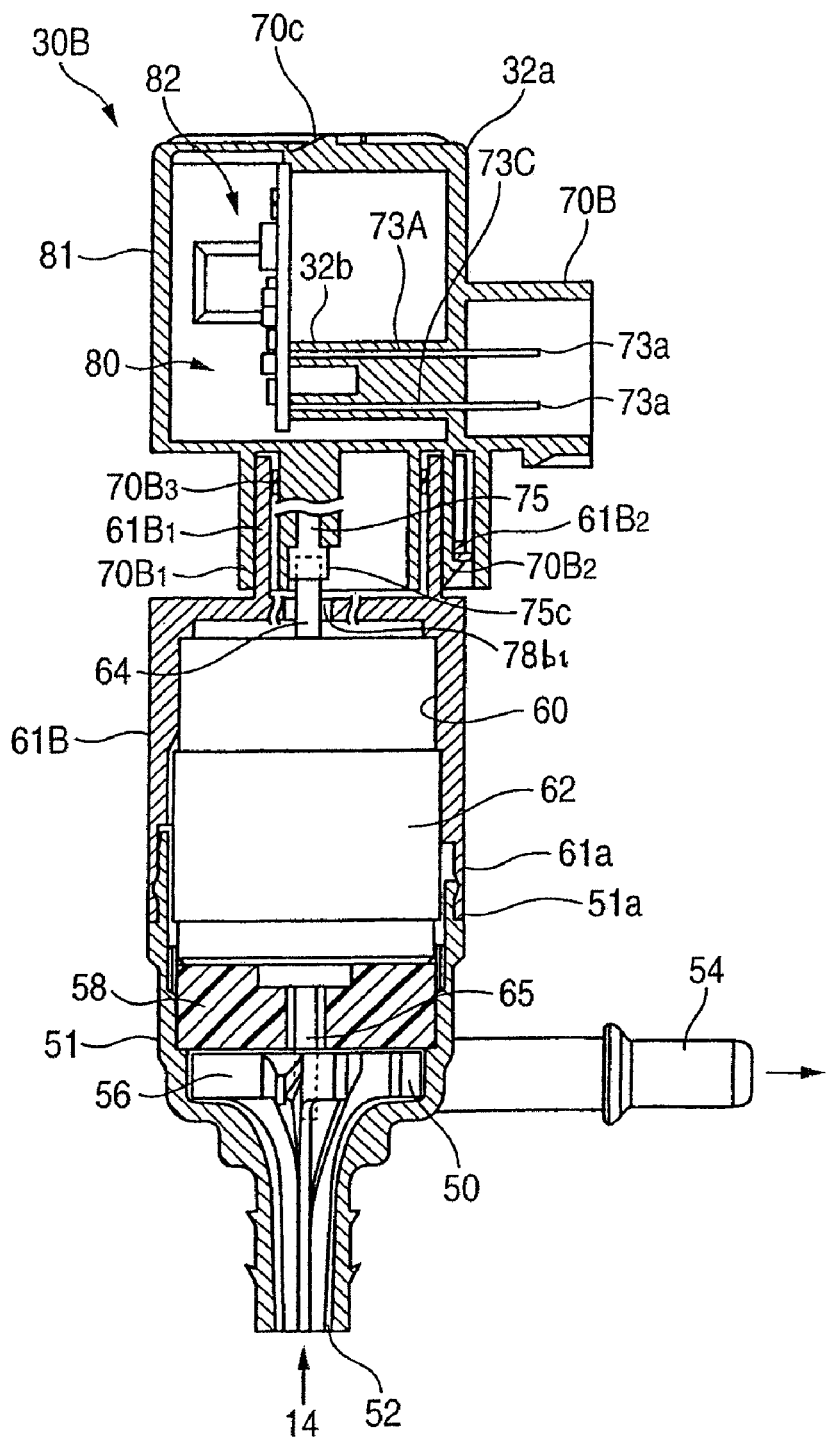
FIG. 10 is a longitudinal sectional view of the motor pump.

FIGS. 9A to 10 show a motor pump 30B according to a third exemplary embodiment.

Like the motor pump 30A of the second exemplary embodiment, the motor pump 30B has a motor housing 61B and a connector portion 70B which are provided as separate members. However, the coupling structure of the motor housing 61B and the connector portion 70B is different from that of the motor housing 61A and the connector portion 70A of the second exemplary embodiment.

A rectangular-cylindrical neck portion 61B1 is formed to extend upward from a ceiling of the motor housing 61B, and another rectangular-cylindrical neck portion 70B1, which is engageable with an outer side portion of the neck portion 61B1 of the motor housing 61, is formed to extend downward from a lower end portion of the connector portion 70B.

The ceiling of the motor housing 61B is formed with holes, which are similar to the holes 78a1, 78b1 formed of the motor housing 61A of the second exemplary embodiment, on an inner side of the neck portion 61B1 The pair of electrode terminals 63, 64 of the motor 62 arranged inside the motor housing chamber 60 protrude from these holes into the neck portion 61B1.

Inside the neck portion 70B1 of the connector portion 70B, the power feeding terminal piece 71 and the grounding terminal piece 75 are extended downward while being supported by a portion of the neck portion 70B1. As shown in FIG. 9C, extending end portions 71c and 75c of the respective terminal pieces 71, 75 are formed with holding portions, which are female terminals.

An elastic hook 70B2 is formed to extend from the neck portion 70B1 of the connector portion 70B, and a locking portion 61B2 for an engagement with the elastic hook 70B2 of the connector portion 70B is formed on the neck portion 61B1 of the motor housing 61B. When the neck portions 61B1, 70B1 are engaged with each other in the longitudinal direction of the motor pump 30B, the elastic hook 70B2 engages with the hook portion 61B2 such that it is prevented from being erroneously pulled out, and the pair of electrode terminals 63, 64 of the motor 62 are fitted in the female terminals (or the holding portions) 71c, 75c of the terminals pieces 71, 75. Moreover, a seal packing 70B3 is interposed between the neck portions 61B1, 70B1.

The remaining configurations of the third exemplary embodiment are similar to those of the motor pump 30 of the first exemplary embodiment. Thus, repetitive explanations thereof are omitted and like parts are designated by the same reference numerals.

Fourth Exemplary Embodiment

Figure 11:
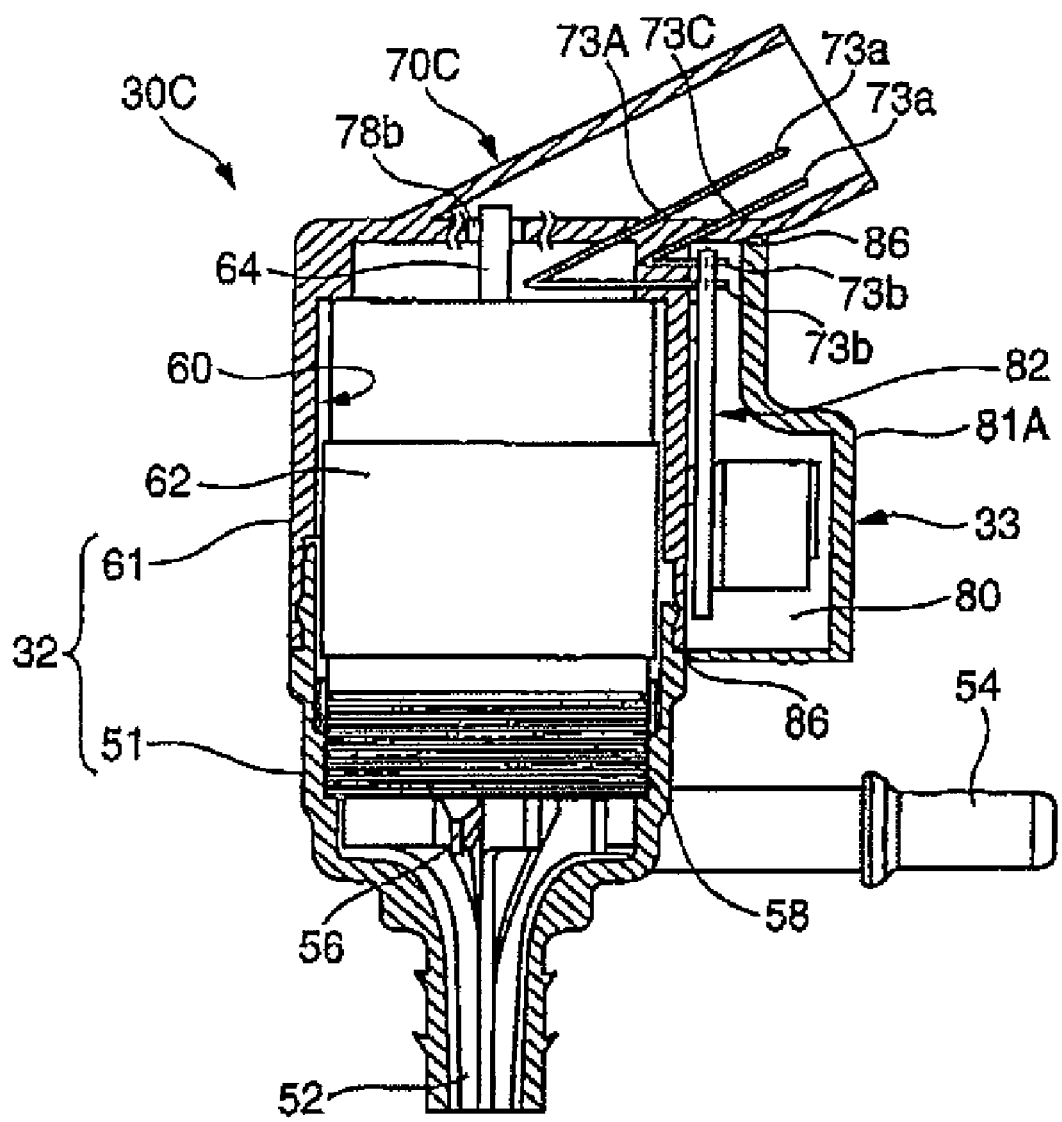
FIG. 11 is a longitudinal sectional view of a motor pump according to a fourth exemplary embodiment of the invention.
Figure 12:
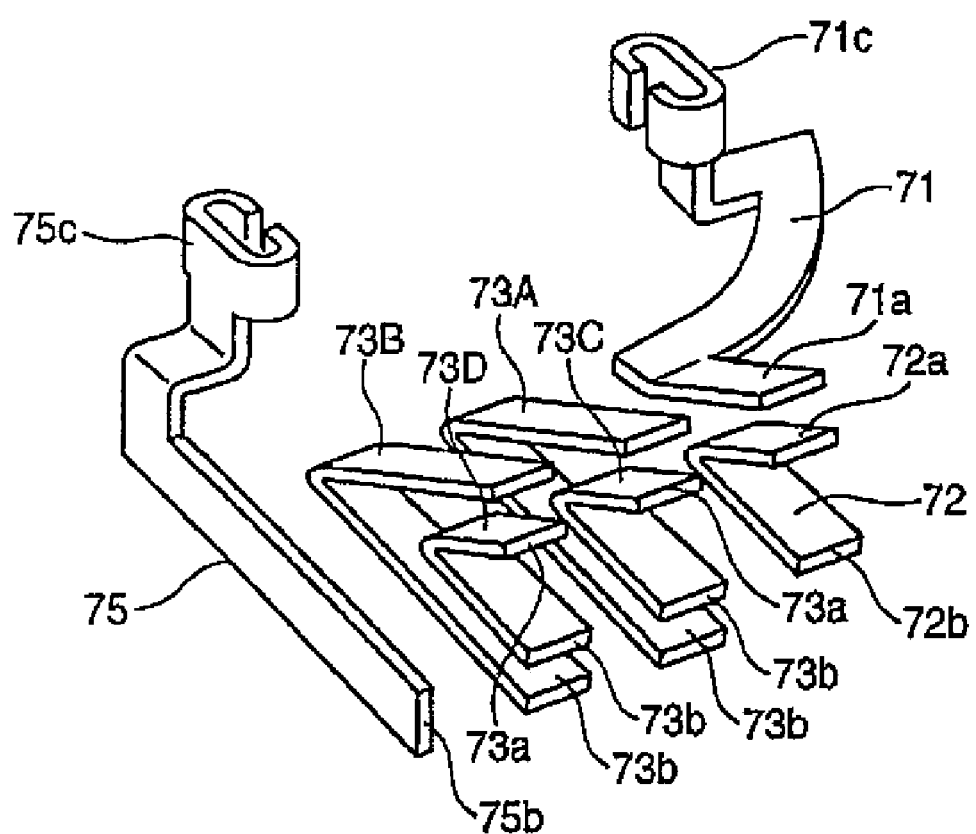
FIG. 12 is a perspective view showing an arrangement of terminals of a connector of the motor pump in the fourth exemplary embodiment.

FIGS. 11 and 12 show a motor pump 30C according to a fourth exemplary embodiment.

In the first to third exemplary embodiments, the connectors 70, 70A, 70B are extended substantially perpendicular to the longitudinal direction the casing 32, i.e., substantially perpendicular to a direction in which the drive shaft 65 of the motor 62 extends. In the motor pump 30C, however, a connector portion 70C is extended obliquely upward from the ceiling of the casing 32.

Further, while the board housing chamber 80 is formed in the upper portion of the inside of the casing 32 in the first to third exemplary embodiments, in this fourth exemplary embodiment, the board housing chamber 80 is formed in an outwardly protruded portion 33 having a rectangular shape, which is disposed right below the connector portion 70C along the outer side portion of the casing 32 (the motor housing 61).

The outwardly protruded portion 33 includes a bottomed board cover 81A having a rectangular shape. The bottomed board cover 81A is attached to the casing 32 (the motor housing 61) by an engagement between a pair of right and left elastic hooks (not shown) formed on right and left side walls of the board cover 81A and a pair of locking portions (not shown) formed at the outer circumference of the casing 32. A seal packing 86 is interposed between the rear opening peripheral edge portion of the bottomed board cover 81A and a surface of the casing 32 to which the board cover 81A is attached.

The ceiling of the motor housing 61 is formed with the communication holes 78a, 78b (the communication hole 78a not shown in FIG. 11) for communicating the inside of the connector portion 70C with the motor housing chamber 60. The pair of electrode terminals 63, 64 (the electrode terminal 63 is not shown in FIG. 11) of the motor 62 arranged inside the motor housing chamber 60 are protruded from the communication holes 78a, 78b into the space inside the connector portion 70C.

Inside the connector portion 70C, there are arranged the power feeding terminal piece 71, the grounding terminal piece 72 and the control signal terminal piece 73 (73A to 73D), the respective end portions 71a, 72a, 73a of which are extended in parallel with a direction in which the connector portion 70 extends and are systematically arranged in upper and lower stages.

The grounding terminal piece 72 and the control signal terminal pieces 73 (73A to 73D) are busbars bent in a V-shape, and the other end portions 72b, 73b of the terminal pieces 72, 73 (73A to 73D) are extended inside the casing 32 and are protruded into the board housing chamber 80 inside the outwardly protruded portion 33. On the other hand, the power feeding terminal piece 71 is a busbar extending from the inside of the connector portion 70C so as to be exposed to the motor housing chamber 60, and is formed such that an end portion there of is upwardly bent from the horizontally extending portion arranged along the casing. The end portion of the terminal piece 71 is set upward at a position corresponding to the communication hole 78a inside the connector portion 70C, and this raised end portion 71c is formed with a holding portion being a female terminal.

The grounding terminal piece 75 is a busbar coupling the negative electrode terminal 64 of the motor 62 and the grounding conducting path (not shown) of the control circuit board 82. The one end portion 75b is so positioned together with the protruding end portions 72b, 73b of the other terminal pieces 72, 73 as to protrude into the board housing chamber 80. The other end portion is set upward at a position corresponding to the communication hole 78b inside the connector portion 70C, and this raised tip end portion 75c is formed with a holding portion being another female terminal.

When the motor 62 is housed in the motor housing 61, therefore, the electrode terminals 63, 64 of the motor 62, which protrude from the communication holes 78a, 78b into the connector portion 70C, are automatically fitted into the female terminals 71c, 75c above the communication holes 78a, 78b, respectively.

The end portions 72b, 73b, 75b of the terminal pieces 72, 73 (73A to 73D)), 75 are positioned and protruded to an outer side of the motor housing 61 (into the board housing chamber 80) right below the connector portion 70C. Therefore, the control circuit board 82 is vertically arranged such that the terminal engaging holes 83 engage with the protruding end portions 72b, 73b, 75b of the terminal pieces 72, 73, 75, and the board cover 81A is then attached to cover the control circuit board 82), whereby the motor pump 30C is assembled.

The remaining configurations of the fourth exemplary embodiment are similar to those of the motor pumps 30, 30A, 30B of the first to third exemplary embodiments. Thus, repetitive explanations thereof are omitted and like parts are designated by the same reference numerals.

The motor pump 30C of the fourth exemplary embodiment may have one or more of the following advantages, When attaching or detaching the power-side connector 90 (vehicle-side connector) with respect to the connector portion of the motor pump, the worker bends his or her upper body into the engine room, and pushes the power-side connector 90 obliquely downward from above the connector portion or pulls the power-side connector 90 obliquely upward. Therefore, as compared with the first to third exemplary embodiments in which the power-side connector 90 needs to be attached to the connector portion of the motor pump in a lateral direction from a side of the connector portion, the worker can easily attach or detach the power-side connector 90 without taking an awkward posture.

Moreover, because the outwardly protruded portion 33 is disposed on the side of the casing 32 right below the connector portion 70 and is used as the board housing chamber 80, it is possible to considerably shorten the height (the total length) of the motor pump as compared with the configuration in which the board housing chamber 80 is formed to vertically extend above the motor housing chamber 60.

Thus, according to the motor pump 30C of the fourth exemplary embodiment, while the control circuit board 82 is arranged vertically, the motor pump can still be downsized in the vertical direction. As a result, the vertical length of the recess portion 15 of the washer fluid tank 14 can be reduced so that the effective capacity of the washer fluid tank 14 can be increased.

Fifth Exemplary Embodiment

Figure 13:
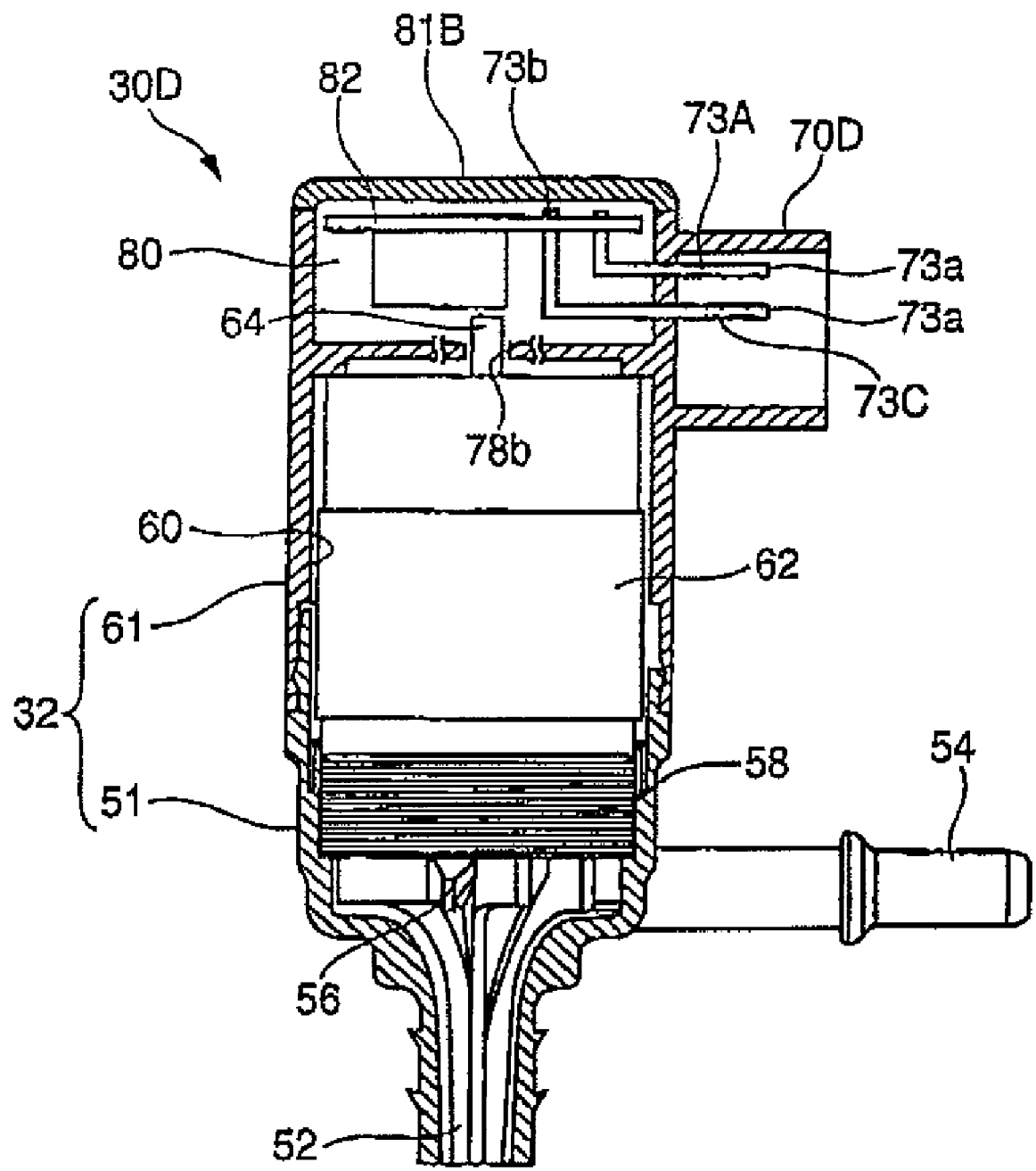
FIG. 13 is a longitudinal sectional view of a motor pump according to a fifth exemplary embodiment of the invention.
Figure 14:
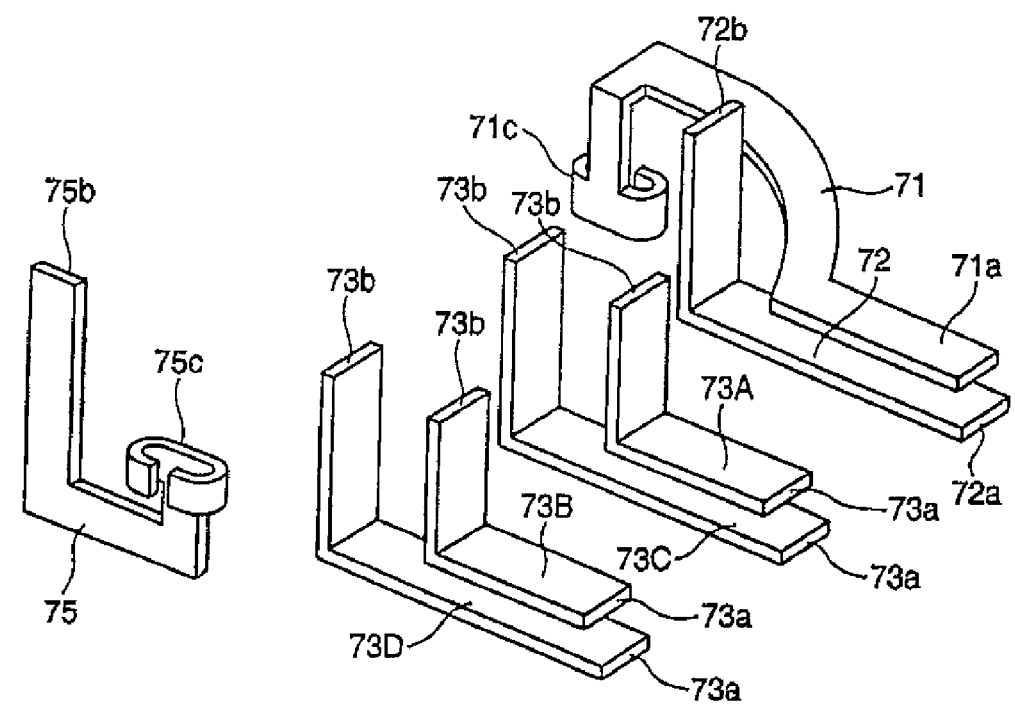
FIG. 14 is a perspective view showing an arrangement of terminals of a connector of the motor pump in the fifth exemplary embodiment.

FIGS. 13 and 14 show a motor pump 30D according to a fifth exemplary embodiment.

While the board housing chamber 80 of the motor pumps 30, 30A, 30B, 30C of the first to fourth exemplary embodiments is longer in the vertical direction than in the lateral direction so that the control circuit board 82 is vertically arranged, the motor pump 30D is configured such that the board housing chamber 80 is longer in the lateral direction than in the vertical direction, and the control circuit board 82 is laterally arranged.

More specifically, the board housing chamber 80 is formed above the motor housing chamber 60 of the casing 32 while utilizing the entire lateral sectional area of inside the casing 32 (the motor housing 61). A board cover 81B is engageable with an upper end portion of the casing 32 (the motor housing 61), and is integrally attached to the casing 32 (the motor housing 61) with locking means (not shown) disposed between board cover 8 in and the casing 32 (the motor housing 61).

A connector portion 70D and the motor housing 61 are formed in a one-piece structure, and the power feeding terminal piece 71, the grounding terminal piece 72 and the control signal terminal piece 73 (73A to 73D) are arranged inside the connector portion 70D. The respective end portions 71a, 72a, 73a are extended along a direction in which the connector portion 70D extends, and are arranged in upper and lower stages.

The grounding terminal piece 72 and the control signal terminal pieces 73 (73A to 73D) are busbars bent in an L shape, and the other end portions 72b, 73b of the respective terminal pieces 72, 73 (73A to 73D) are extended upward inside the board housing chamber 80. On the other hand, the power feeding terminal piece 71, which is extended from the inside of the connector portion 70D so as to be exposed to the motor housing chamber 60, is a busbar which is extended horizontally along the casing 32 and downwardly bent. The other end portion 71c of the terminal piece 71, which is positioned to correspond to the communication hole 78a formed on the bottom surface of the board housing chamber 80 is formed with a holding portion being a female terminal.

The grounding terminal piece 75, which is a L-shaped busbar coupling the negative electrode terminal 64 of the motor 62 and the grounding conducting path (not shown) of the control circuit board 82, is so positioned together with the protruding end portions 72b, 73b of the other terminals 72, 73 as to protrude upward. The other end portion 75c, which is positioned to correspond to the communication hole 78b formed on the bottom surface of the board housing chamber 80, is formed with a holding portion being another female terminal.

Inside the board housing chamber 80, the end portions 72b, 73b, 75b, which are so positioned with respect to a terminal reference plane (not shown) as to protrude upward, are engaged with the terminal engaging holes 83 of the control circuit board 82, and the control circuit board 82 laterally arranged.

Moreover, the electrode terminals 63, 64 of the motor 62, which protrude into the board housing chamber 80 through the communication holes 78a, 78b of the bottom surface of the board housing chamber 80, are fitted into the female terminals 71c, 75c, respectively, which are disposed above the communication holes 78a, 78b.

The remaining configurations of the fifth exemplary embodiment are similar to those of the motor pump 30, 30A, 30B, 30C of the first to fourth exemplary embodiments. Thus, repetitive explanations thereof are omitted and like parts are designated by the same reference numerals.

According to the fifth exemplary embodiment, because the board housing chamber 80 formed above the motor housing chamber 60 is shorter in the vertical direction as compared with the first to third exemplary embodiment, the vertical dimension of the motor pump 30D can be made small.

As a result, the recess portion 15 of the washer fluid tank 14 can be made smaller so that the effective capacity of the washer fluid tank 14 is increased.

While description has been made in connection with exemplary embodiments of the present invention, those skilled in the art will understand that various changes and modification may be made therein without departing from the present invention. It is aimed, therefore, to cover in the appended claims all such changes and modifications falling within the true spirit and scope of the present invention.

What is claimed is:

1. A motor pump for a headlamp cleaner, the motor pump comprising:
   a motor;
   a control circuit board for driving the motor;
   an impeller rotatable by the motor;
   a plurality of terminal pieces adapted to be coupled to an outside connector; and
   a casing comprising:
      a pump chamber inside which the impeller is accommodated, the pump chamber comprising a washer fluid suction port and a discharge port;
      a motor housing chamber inside which the motor is accommodated, wherein the motor housing chamber is disposed above the pump chamber;
      a board housing chamber inside which the control circuit board is accommodated; and
      a connector portion inside which the plurality of terminal pieces extends,
   wherein the connector portion extends outwardly in a cylindrical shape,
   wherein the connector portion is provided such that one of the plurality of terminal pieces inside the connector portion is directly coupled to the motor, and
   wherein the plurality of terminal pieces comprises:
      a power feeding terminal piece through which power is fed to the motor from the outside connector;
      a ground terminal piece; and
      a plurality of control signal terminal pieces coupled to the control circuit board,
         wherein either one of the power feeding terminal pieces and the grounding terminal piece is directly coupled to the motor.

2. The motor pump according to claim 1, wherein the motor comprises a drive shaft to which the impeller is coupled, and the connector portion extends sideways with respect to a direction in which the drive shaft extends.

3. The motor pump according to claim 1, wherein each of the terminal pieces is a busbar.

4. The motor pump according to claim 1, wherein the casing further comprises a terminal portion having a reference plane facing the board housing chamber, the plurality of control signal terminal pieces extend through the terminal portion and protrude toward the board housing chamber from the reference plane, the control circuit board is formed with terminal engaging holes corresponding to each of the respective control signal terminal pieces, and each of the control signal terminal pieces engage with corresponding terminal engaging holes such that the control circuit board abuts the reference plane.

5. The motor pump according to claim 4, wherein the casing further comprises a detachable cover which, when attached, covers the control circuit board to form the board housing chamber, and the control signal terminal pieces protrude from the terminal engaging holes toward the cover.

6. The motor pump according to claim 1,
   wherein the board housing chamber is disposed above the motor housing chamber and on a side of the connector portion in a lateral direction perpendicular to the direction in which the motor housing chamber and the pump chamber are arranged.

7. The motor pump according to claim 6, wherein the connector portion extends in a direction perpendicular to a heightwise direction of the casing, a heightwise dimension of the board housing chamber is larger than a lateral dimension of the board housing chamber, the lateral dimension of the board housing chamber is about one half of a lateral dimension of the motor housing chamber, and the control circuit board is vertically arranged inside the board housing chamber.

8. The motor pump according to claim 6, wherein the connector portion extends in a direction perpendicular to a heightwise direction of the casing, a heightwise dimension of the board housing chamber is smaller than a lateral dimension of the board housing chamber, the lateral dimension of the board housing chamber is approximately equal to a lateral dimension of the motor housing chamber, and the control circuit board is laterally arranged inside the board housing chamber.

9. The motor pump according to claim 1,
   wherein the board housing chamber is disposed below the connector portion and on a side of the motor housing chamber in a lateral direction perpendicular to the direction in which the motor housing chamber and the pump chamber are arranged.

10. The motor pump according to claim 9, wherein the connector portion extends in an obliquely upward direction from the motor housing chamber, a heightwise dimension of the board housing chamber is larger than a lateral dimension of the board housing chamber, and the control circuit board is vertically arranged inside the board housing chamber.

11. The motor pump according to claim 1,
   wherein the motor comprises a drive shaft to which the impeller is coupled, and the control circuit board is disposed above the motor in a direction of the drive shaft, and parallel to the drive shaft.

12. A casing for a motor pump for a headlamp cleaner comprising
   a motor;
   an impeller rotatable by the motor;
   a control circuit board for driving the motor; and
   a plurality of terminal pieces adapted to be coupled to an outside connector,
   the casing comprising:
      a pump chamber for accommodating the impeller, the pump chamber comprising a washer fluid suction port and a discharge port;
      a motor housing chamber for accommodating the motor, wherein the motor housing chamber is disposed above the pump chamber;
      a board housing chamber for accommodating the control circuit board; and
      a connector portion inside which the plurality of terminal pieces extends,
   wherein the connector portion extends outwardly in a cylindrical shape,
   wherein the connector portion straddles a wall the motor housing chamber and the board housing chamber, and
   wherein the plurality of terminal pieces comprises:
      a power feeding terminal piece through which power is fed to the motor from the outside connector;
      a grounding terminal piece; and
      a plurality of control signal terminal pieces coupled to the control circuit board,
         wherein either one of the power feeding terminal piece and the grounding terminal piece is directly coupled to the motor.

13. The casing according to claim 12 further comprising: a terminal portion having a reference plane facing the board housing chamber; the plurality of control signal terminal pieces extend through the terminal portion and protrude toward the board housing chamber from the reference plane, the control circuit board is formed with terminal engaging holes corresponding to each of the respective control signal terminal pieces, and each of the control signal terminal pieces engage with corresponding terminal engaging holes such that the control circuit board abuts the reference plane.

14. The casing according to claim 13 further comprising: a detachable cover which, when attached, covers the control circuit board to form the board housing chamber, and the control signal terminal pieces protrude from the terminal engaging holes toward the cover.

15. The casing according to claim 12, wherein the board housing chamber is disposed above the motor housing chamber and on a side of the connector portion in a lateral direction perpendicular to the direction in which the motor housing chamber and the pump chamber are arranged.

16. The casing according to claim 15, wherein the connector portion extends in a direction perpendicular to a heightwise direction of the casing, a heightwise dimension of the board housing chamber is larger than a lateral dimension of the board housing chamber, the lateral dimension of the board housing chamber is about one half of a lateral dimension of the motor housing chamber, and the control circuit board is vertically arranged inside the board housing chamber.

17. The casing according to claim 15, wherein the connector portion extends in a direction perpendicular to a heightwise direction of the casing, a heightwise dimension of the board housing chamber is smaller than a lateral dimension of the board housing chamber, the lateral dimension of the board housing chamber is approximately equal to a lateral dimension of the motor housing chamber, and the control circuit board is laterally arranged inside the board housing chamber.

18. The casing according to claim 12, wherein the board housing chamber is disposed below the connector portion and on a side of the motor housing chamber in a lateral direction perpendicular to the direction in which the motor housing chamber and the pump chamber are arranged.

19. The casing according to claim 18, wherein the connector portion extends in an obliquely upward direction from the motor housing chamber, a heightwise dimension of the board housing chamber is larger than a lateral dimension of the board housing chamber, and the control circuit board is vertically arranged inside the board housing chamber.

\* \* \* \* \*

UNITED STATES PATENT AND TRADEMARK OFFICE
CERTIFICATE OF CORRECTION

| | | |
|---|---|---|
| PATENT NO. | : 8,262,374 B2 | Page 1 of 1 |
| APPLICATION NO. | : 12/167612 | |
| DATED | : September 11, 2012 | |
| INVENTOR(S) | : Yuichi Nakazawa et al. | |

It is certified that error appears in the above-identified patent and that said Letters Patent is hereby corrected as shown below:

In the Abstract on the title page:

- At line 12, "pieces extends" should be changed to -- pieces extend --.

- At column 13, claim number 1, line 24, "a connector portion inside which the plurality of terminal pieces extends" should be changed to -- a single connector portion inside which all of the plurality of terminal pieces extent --.

- At column 13, claim number 1, line 37, "pieces" should be -- piece --.

- At column 14, claim number 12, line 53-54, "a connector portion inside which the plurality of terminal pieces extends" should be changed to -- a single connector portion inside which all of the plurality of terminal pieces extent --.

- At column 14, claim number 12, line 57, the words of phrase "a wall the motor housing chamber" should be -- a wall partitioning the motor housing chamber --.

Signed and Sealed this
Eighteenth Day of December, 2012

David J. Kappos
*Director of the United States Patent and Trademark Office*